United States Patent [19]
Hernqvist et al.

[11] 3,730,606
[45] May 1, 1973

[54] METHOD FOR FABRICATING A GAS LASER TUBE

[75] Inventors: Karl Gerhard Hernqvist, Princeton; Donald Chester Pultorak, Trenton, both of N.J.

[73] Assignee: RCA Corporation, New York, N.Y.

[22] Filed: May 8, 1970

[21] Appl. No.: 35,691

[52] U.S. Cl. ................................. 316/19, 316/18
[51] Int. Cl. ......................................... H01j 9/18
[58] Field of Search..................316/22, 24, 26, 18, 316/19, 20, 21

[56] References Cited

UNITED STATES PATENTS

| | | | |
|---|---|---|---|
| 682,699 | 9/1901 | Hewitt | 316/22 |
| 1,965,582 | 7/1934 | Foulke | 316/22 X |
| 2,200,221 | 5/1940 | Swinehart et al. | 316/22 |
| 1,802,473 | 4/1951 | Lebrun | 316/22 |
| 2,636,664 | 4/1953 | Hirtzler | 316/22 X |
| 3,342,538 | 9/1967 | Mitrofanov | 316/22 |
| 3,492,598 | 1/1970 | MacNair | 316/22 X |

*Primary Examiner*—John F. Campbell
*Assistant Examiner*—Richard Bernard Lazarus
*Attorney*—Edward J. Norton

[57] ABSTRACT

The process of manufacturing a vapor-type gas laser tube, such as a He-Cd or He-Zn for example, is considerably simplified by inserting the active material to be vaporized within the evaporator before the tube is put together. This means that baking of the tube, after it is put together, must be done at a lower temperature than is usual in order to avoid evaporation of the active material during baking. However, flushing the tube cavity with an inert gas, such as helium, after baking at this lower temperature, results in the removal of unwanted residual impurities being just as great as conventional baking at higher temperature.

4 Claims, 2 Drawing Figures

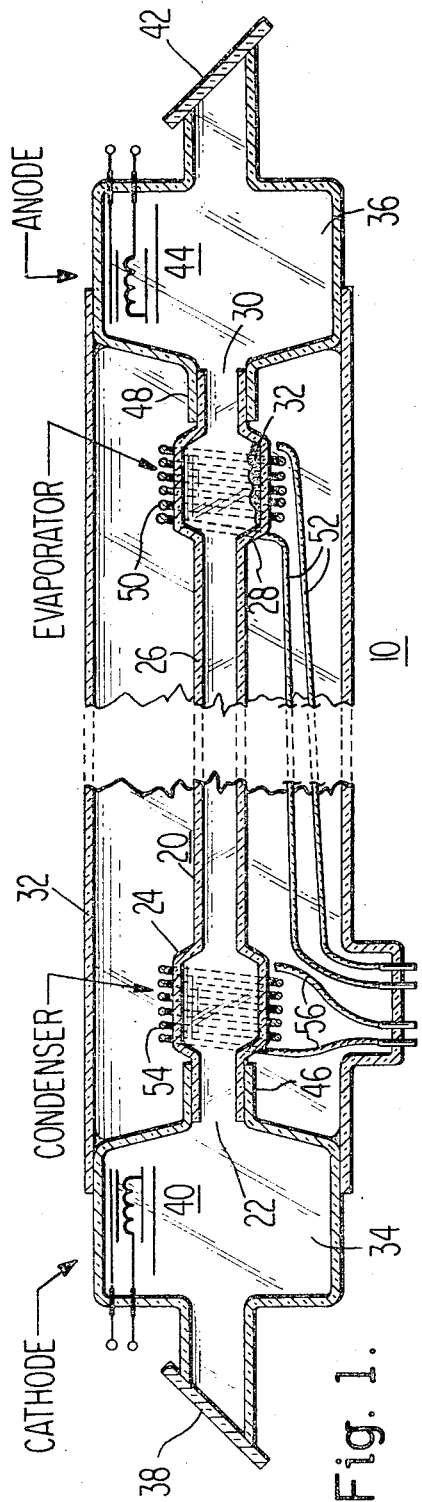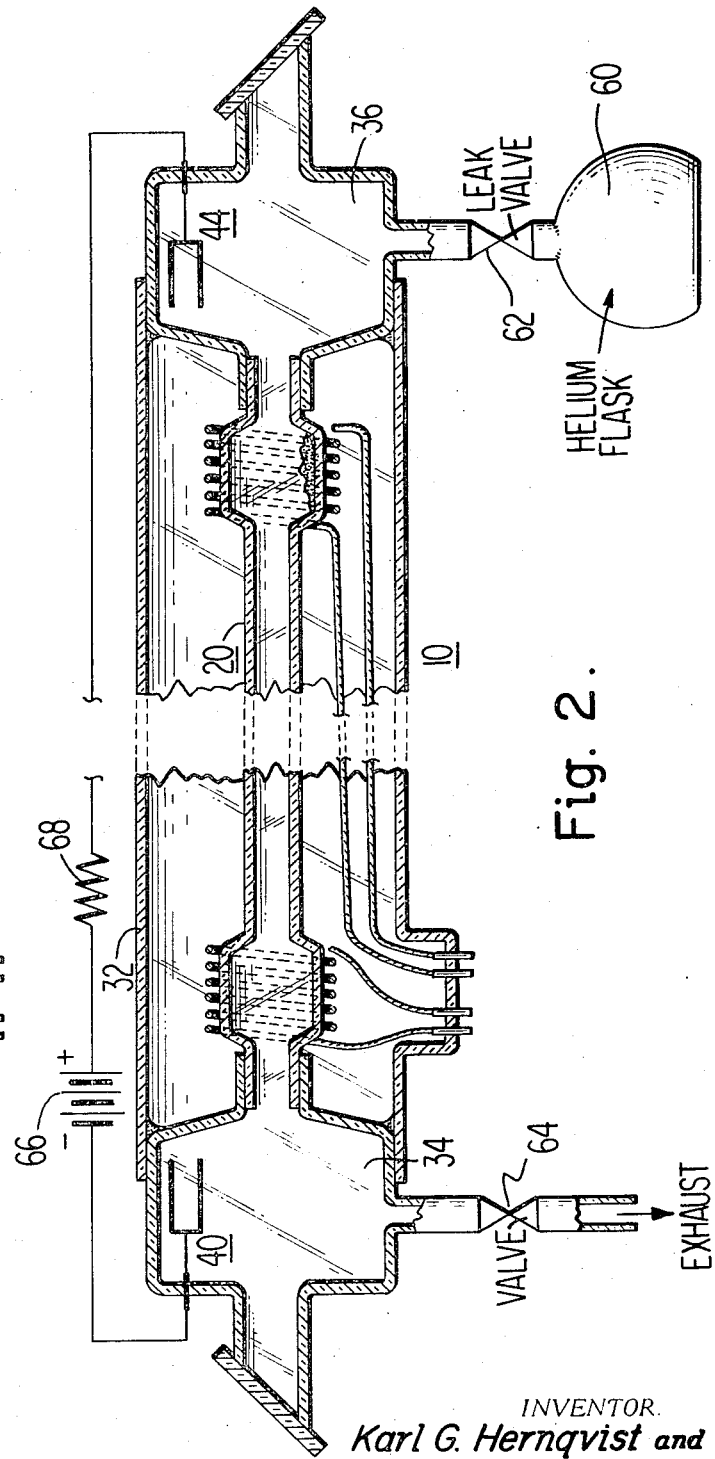

METHOD FOR FABRICATING A GAS LASER TUBE

This invention relates to a method for removing residual impurities from gas laser tubes, which, for any reason, must be baked at a relatively lower temperature than is conventional and, more particularly, to the special utility of such a method in the manufacturing of vapor-type gas laser tubes.

Vapor-type gas lasers, such as He-Cd or He-Zn for example, have recently been developed. Such lasers use cataphoretic techniques to confine the vapor to a limited region of the discharge tube. This region consists of the main discharge bore, a condenser, and an evaporator. Initially the active material to be vaporized is present only in the evaporator in solid form.

The fabrication method for such a laser conventionally includes the steps of evacuation of the tube envelope, baking at a relatively high temperature (such as 400° C) to remove undesired impurities, cooling the envelope, and finally distilling the active material into the evaporator through a temporary tube extending from the evaporator to an external source of the active material.

This last step turns out to be both time consuming and critical. The evaporation must be done at a slow rate (over a period of many hours) with the temperature of both the source and the various portions of the tube critically adjusted so that substantially all the evaporated active material will condense in the evaporator, rather than elsewhere in the tube. Thus, although this method is acceptable for laboratory fabrication of a few of such tubes under the control of highly trained personnel, it does not lend itself to the larger scale manufacturing production.

One of the advantages of the present invention is that it makes it possible to insert the active material to be vaporized in the evaporator before the tube is assembled, thereby eliminating the time-consuming and critical techniques, just discussed, which are normally employed to introduce the active material to be vaporized into the evaporator.

It is therefore an object of the present invention to provide an improved technique for removing residual impurities from gas laser tubes baked at relatively low temperatures which is particularly useful in manufacturing vapor-type gas laser tubes.

This and other objects, features and advantages of the present invention will become more apparent from the following detailed description taken together with the accompanying drawing, in which:

FIG. 1 shows the manner in which the tube of the present invention may be constructed, and FIG. 2 shows the manner in which such a tube may be processed, after construction, to remove residual impurities.

Referring now to FIG. 1, tube 10 includes a single tubular member 20. Member 20, which may be composed of a quartz capillary, consists of relatively narrow diameter left-hand portion 22, relatively wide diameter condenser portion 24, relatively narrow diameter bore portion 26, relatively wide diameter evaporator portion 28 and relatively narrow right-hand portion 30. Before tube 10 is assembled, a quantity of active material 32, such as Cd or Zn, in solid form, is deposited within evaporator portion 28 of tubular member 20, as shown. Thus, at this time since the tube not assembled, tubular portion 20 need not be evacuated at the time that active material 32 is deposited within evaporator portion 28. Thus, it is simple to insert the required amount of active material 32 solely in evaporator portion 28 of tubular member 20 before tube 10 is assembled.

Tube 10 further includes an outer envelope 32, left-end portion 34, which is sealed to the left-end of envelope 32, and right-end portion 36, which is sealed to the right-end of envelope 32.

Left-end portion 34 is terminated by left Brewster angle window 38 and contains therein cathode electrode structure 40, a heater therefor, and a getter (not shown), all of which are conventional. Similarly, right-hand end portion 36 is terminated by right Brewster angle window 42 and contains therein anode electrode structure 44 and a getter (not shown), all of which are conventional.

Left-end portion 22 of tubular member 20 fits into end section 46 of left-hand end portion 34, while right-end portion 30 of member 20 fits into section 48 of right-hand end portion 36. The clearance between portion 22 and section 46 and the clearance between portion 30 and section 48, respectively, is about 5 mils. This permits the respective ends of tubular member 20 to be easily inserted into sections 46 and 48, respectively, before left-end portion 34 and right-end portion 36, respectively, are sealed to envelope 32. However, the relatively small clearance of 5 mils confines any discharge which later takes place between cathode 40 and anode 44 to the interior bore of tubular member 20. Thus, it is not essential that left-end portion 22 of member 20 ever be sealed to section 46 or right-end portion 30 of member 20 ever be sealed to section 48. However, after assembly, one or both of these sections may be sealed.

Evaporator portion 28 is surrounded by a nichrome heater 50, which is coupled to the outside of tube 10 by conductors 52. This permits material 32 to be evaporated during operation of tube 10. (A similar heater 54, which is coupled to the outside of tube 10 by conductors 56, surrounds condenser portion 24. Originally, heater 54 is not utilized. However, after many hours of operation of tube 10, when substantially all of material 32 has been evaporated from evaporator portion 28, cataphoretically transported through bore 26 to condenser portion 24, and condensed therein, by utilizing heater 54, rather than heater 50, the evaporator and condenser functions of tube 10 may be reversed and the life of tube 10 extended).

The fact that active material 32 has already been inserted in evaporator portion 28 at the time that tube 10 is assembled creates a problem in getting rid of substantially all impurities, as is required. Conventionally, after assembly, the tube is evacuated and is then baked at the relatively high temperature of about 400°C for a period of many hours. This satisfactorily removes adsorbed gases and other impurities which are required to be eliminated. However, in the present invention, tube 10 cannot be heated to a temperature this high because it would result in a substantial amount of active material 32, which has already been deposited in evaporator portion 28, being evaporated by the high-temperature baking out process. This would cause undesirable condensing out on other portions of tube 10 of material 32. Thus, in the case of tube 10, the baking out process must be done at a substantially lower temperature (such as 200° C for Cd or 250° C for Zn). This low-temperature baking out of assembled tube 10 takes place for many hours (about 10 hours) and is effective in removing a good deal of the impurities present. However, due to the relatively low temperature of this baking out process, a residual amount of impurities (over and above the amount which would remain after baking out at a relatively high temperature) still remains in tube 10 after low-temperature baking out has bee completed. It is essential that these residual impurities be removed. This is accomplished by the technique shown in FIG. 2.

Referring now to FIG. 2, the assembled tube 10 is filled with a quantity of relatively cheap $He^4$ from helium flask 60, which is connected to right end portion 36 of tube 10 through leak valve 62, as shown. Further, left end portion 34 of tube 10 is connected to an exhaust system (not shown) through an adjustable valve 64. In addition, a power supply (shown schematically as battery 66 and current-limiting resistance 68) is connected with the proper polarity between cathode 40 and anode 44 to effect a discharge in the helium within end portion 34 and 36 and tubular member 20 of tube 10.

In addition, valves 62 and 64 are adjusted to provide a predetermined relatively slow flow rate (such as 1 torr-liter per minute) of helium from helium flask 60 through tubular member 20 of tube 10 and out the exhaust, as shown. Thus, not only does a discharge take place in the helium flowing through tube 10, but this flowing helium plasma is utilized for flushing out residual impurities within tube 10.

Initially, the discharge glow near the exhaust end, at the cathode, shows a bluish tint, indicating evolution of gas impurities in the tube. At the helium inlet end, in the vicinity of the anode, the glow is yellowish, indicating only a helium discharge. By gradually increasing the discharge current through the tube to about 60 milliamperes (where the normal operation of the tube is 40 milliamperes), it has been found that after about 1½ hours the bluish glow at the cathode end disappeared and the glow was identical in appearance to the glow at the anode end. At this time the discharge was turned off.

After the discharge has been turned off, leak valve 62 is closed and the exhaust is permitted to evacuate tube 10. If getters are being used, after evacuation they are flashed. Then, fresh helium is introduced (which may be the more expensive $He^3$, which is desirable for laser operation). After this, the tube is sealed off and is operated. After about one-half hour of operation, it was found that the sealed-off tube had stabilized and the operation of the tube was similar to tubes prepared in the conventional manner, where baking takes place at a much higher temperature (such as 400° C).

The simplified processing techniques of vapor-type gas lasers described herein makes possible the construction of inexpensive vapor-type gas laser tubes, which are only slightly more complex than He-Ne laser tubes. Several hours reduction in tube processing time is accomplished by introducing the active material to be vaporized prior to the assembly of the tube.

In addition, the flow-through technique described in connection with FIG. 2 for removing residual impurities from a laser tube may be employed in all situations in which high temperature bake out is prohibited. For instance, high temperature bake out is prohibited when epoxy or mylar window seals are used or mirrors are part of the tube construction.

What is claimed is:

1. A method of fabricating a vapor laser discharge tube employing as a given active lasing material one which is in solid form at room temperature and which evaporates at a first given temperature above room temperature, said first given temperature being below a bakeout temperature normally required to remove certain impurities initially present in said tube being fabricated, said method comprising the steps of:
   a. depositing said active material in solid form in an evaporator of said tube prior to assembly of said tube,
   b. then assembling said tube with said active material already deposited in said evaporator,
   c. baking out said assembled tube at a second given temperature between room temperature and said first given temperature, whereby a first portion of said certain impurities is removed but a residual second portion of said certain impurities remains,
   d. thereafter continuously flushing said tube with an inert gas which flows through said tube from one end to the other at a given flow rate, and
   e. while flushing said tube establishing a discharge within the inert gas then filling said tube, whereby, after a predetermined time interval substantially all of said residual second portion of said certain impurities is removed from said tube.

2. The method defined in claim 1, wherein said inert gas is helium.

3. The method defined in claim 1, further including the steps of evacuating said tube after said predetermined time interval, flashing any getters after evacuation, refilling said tube with a sufficient amount of inert gas for operation, and sealing said tube.

4. The method defined in claim 3, wherein said first mentioned inert gas is $He^4$, wherein said second-mentioned inert gas is $He^3$, and wherein said active material is cadmium.

* * * * *